Figure 1:
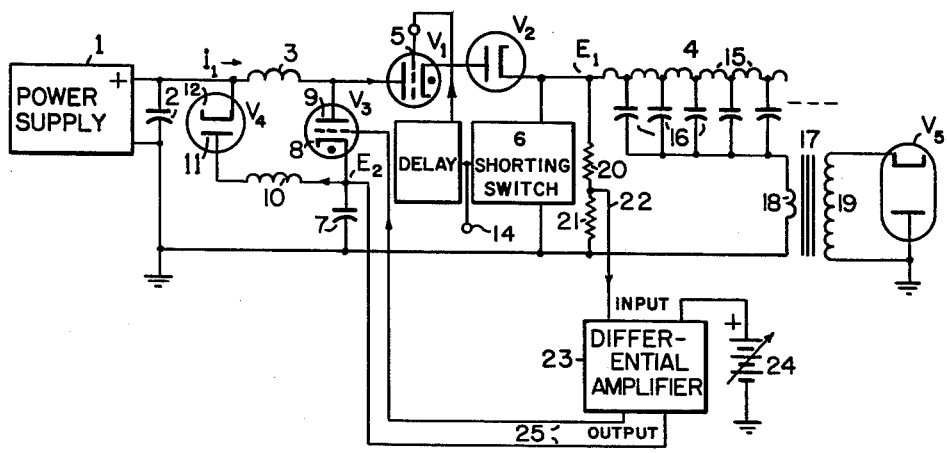

June 30, 1964

J. A. ROSS ETAL 3,139,585

VOLTAGE CONTROLLING CIRCUIT FOR LINE TYPE MODULATOR
WITH MEANS FEEDING BACK EXCESS POWER TO SOURCE

Filed June 26, 1962

INVENTORS
JAMES A. ROSS
CHARLES THEODORE

BY *Harry R. Lubcke*

AGENT

United States Patent Office 3,139,585
Patented June 30, 1964

3,139,585
VOLTAGE CONTROLLING CIRCUIT FOR LINE TYPE MODULATOR WITH MEANS FEEDING BACK EXCESS POWER TO SOURCE
James A. Ross, Anaheim, and Charles Theodore, Los Angeles, Calif., assignors to Ling-Temco-Vought, Inc., Dallas, Tex., a corporation of Delaware
Filed June 26, 1962, Ser. No. 205,349
10 Claims. (Cl. 328—65)

Our invention relates to amplitude voltage control for line type modulators and particularly to means for uniformly limiting the amplitude of the pulse output of a line type modulator on a pulse-to-pulse basis.

In the same general way that electronic regulated power supplies are important elements in present-day technology a means to regulate the output amplitude of a pulse modulator is also desirable. Attempts have been made to accomplish such pulse regulation, but these have fallen short of what is desired.

When the attempt has been to modify the power supply reactor of a line type pulse modulator to become a transformer, undesirable transients have been introduced. Since the reactor must have non-saturating properties, it is made with an air-gap in the ferrous core. The resulting transformer thus has undesirably loose coupling between the primary and the secondary. Because of this characteristic severe voltage transients are created in the reactor circuit and these must be attenuated by loss-producing resistance-capacitance pairs of elements connected in the primary or reactor part of the circuit. While the secondary of the thus-formed transformer passes some electrical energy back to the power supply, the losses in the resistance-capacitance pairs is more than desired.

Another attempt has been to bleed-off an increment of power supply energy in an amount to give uniformity of pulse output and then to fully dissipate the increment of energy. This wastes more electrical energy than is desirable, particularly in high voltage high power equipment.

We have been able to provide desired regulation at relatively no loss by a new structure, which includes a reactor for feeding-back the surplus electrical energy from the regulator apparatus to the power supply. Additionally, it is possible to provide a relatively long time between pulses during which voltage is withheld from the shorting element of the modulator. This insures improved reliability of operation.

An object of our invention is to provide regulating apparatus for equipment of the nature of a pulse type modulator.

Another object is to provide such apparatus as has substantially no loss of electrical energy.

Another object is to accomplish regulation with relatively simple apparatus.

Another object is to withhold voltage from the shorting element of a pulse type modulator for a period of time sufficiently long to insure reliability of operation.

Other objects will become apparent upon reading the following detailed specification and upon examining the accompanying drawings, in which are set forth by way of illustration and example, certain embodiments of our invention.

Figure 2:
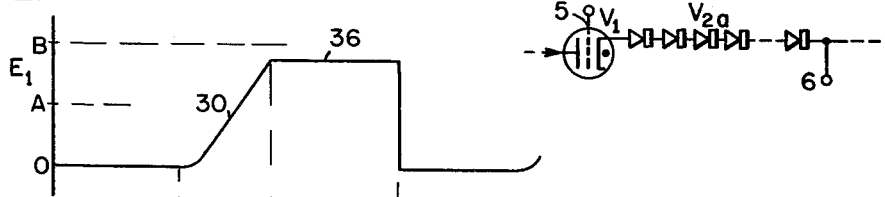
Figure 3:
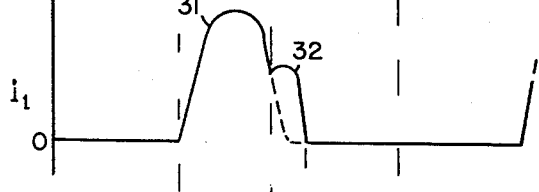
Figure 4:
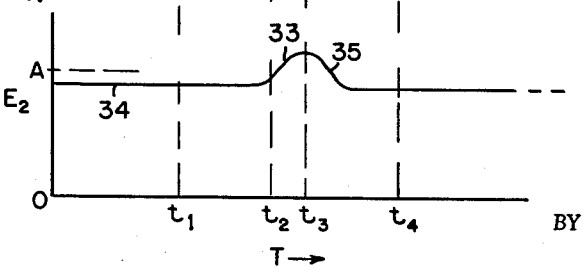
Figure 5:

FIG. 1 shows a schematic diagram of our invention,
FIG. 2 shows the voltage waveform appearing at the input to the line of the modulator,
FIG. 3 shows the current flowing through the power supply reactor,
FIG. 4 shows the voltage across the capacitor of our regulating apparatus, and
FIG. 5 shows a fragmentary schematic diagram according to FIG. 1 for a silicon diode alternate arrangement.

The circuit of FIG. 1 may be employed for a pulse modulator of almost any power level, but the embodiment to be hereinafter described is for high power. At such levels, embracing the most powerful modulators yet constructed, the attributes of our apparatus are particularly important, not only from the absolute magnitude of the power saved, but from the reliability of operation achieved.

In FIG. 1, power supply 1 may be of the conventional type employing a bridge rectifier and providing, say, 20 kilovolts (k.v.) of direct current electrical energy and a current capability of five amperes. The output filter capacitor of this power supply is element 2. Inductor 3 is the charging reactor for the line-charging type modulator. Since this inductor is not required to constitute the primary of a transformer, as is required in certain aspects of the prior art, we prefer to employ an air-core inductor. This eliminates the core loss and so contributes to high efficiency operation. Typically, an inductance of 0.2 henry is required.

Tubes $V_1$ and $V_2$ are pass tubes, connected in series between inductor 3 and the artificial transmission line, generally indicated as elements 4. $V_1$ is a gaseous type thyratron and $V_2$ is a diode, which may be of the silicon type or of the hard vacuum tube type. Network 4 thus charges to the voltage of the power supply whenever thyratron $V_1$ is fired by an appropriate positive pulse upon its grid 5. The network would normally reach about twice the power supply voltage, or 40 k.v., because of the resonant type of charge. However, in order to provide a margin of voltage for regulation, this charging is stopped short of the maximum value.

FIG. 2 shows a plot of the voltage $E_1$ appearing at the input to the network 4 as a function of time. Amplitude level "A" represents the voltage of power supply 1 and amplitude "B" represents twice that amount. It will be noted that the resulting voltage waveform reaches a maximum amplitude at time $t_2$ (see the time scale at the bottom of all of the waveforms) and that this amplitude is less than voltage level "B."

In FIG. 2, time=zero corresponds to the prior firing of shorting switch 6 and the occurrence of the last pulse output from the modulator. A time interval then occurs, to time $t_1$, of perhaps 1,000 microseconds for a particular embodiment, during which time the voltage reaching network 4 and switch 6 is zero. At time $t_1$ thyratron $V_1$ is fired and the charge cycle is initiated. This is identified by the ascending line 30 in FIG. 2. At time $t_2$ thyratron $V_3$ is fired. This halts the upward rise of voltage as has been previously mentioned.

It is to be noted that thyratron $V_3$ and capacitor 7 are in series across the output of the power supply beyond reactor 3, in that the anode of the thyratron is connected to the far side of the reactor, the cathode of the thyratron is connected to the capacitor and the other terminal of the capacitor is connected to ground. Prior to time $t_2$ the voltage upon capacitor 7 is less than that of the power supply, the latter having an amplitude "A" in all figures, and the former having the amplitude 34 in FIG. 4.

During the time from $t_1$ to $t_2$ current $i_1$ has been flowing through reactor 3 and tubes $V_1$ and $V_2$ to charge line 4. This has the shape of a half cycle of a sine wave due to the generally resonant nature of such charging. This is shown in FIG. 3. At time $t_2$, however, thyratron $V_3$ is fired (i.e., a potential is impressed upon the grid thereof to cause the tube to conduct). This diverts the current flow from transmission line 4 to passage through thyratron $V_3$ to charge capacitor 7. This diversion takes place because the voltage across capacitor 7 is less than that of power supply 1, as has been mentioned.

The charging of capacitor 7 is also resonant in character. This causes a small peak of current 32 in the waveform of FIG. 3 and a rise in the voltage $E_2$, FIG. 4, to a value greater than the voltage amplitude "A" of the power supply. As capacitor 7 charges, current 32 will decrease, finally reaching zero at time $t_3$, as shown in FIG. 3. At this time also, the maximum rise of part 33 of waveform $E_2$ is reached, as shown in FIG. 4. This voltage condition back-biases thyratron $V_3$; i.e., the potential of cathode 8 is greater than that of anode 9 and so current flow through the thyratron ceases.

A circuit consisting of inductor 10 and diode $V_4$ is provided to return the excess charge from capacitor 7 to capacitor 2 and thus effect economy in electrical operation. Inductor 10 is of the same nature as prior inductor (reactor) 3 and may be air core for minimum loss. It does not carry as large a current as inductor 3 and so may be wound with smaller wire. Preferably inductor 10 should have approximately 50% more inductance than inductor 3, thus an inductance of 0.3 henry in a typical embodiment.

Diode $V_4$ is employed to prevent a reverse current through inductor 10 to capacitor 7 when thyratron $V_3$ is not conducting and when the potential $E_2$ across capacitor 7 is less than that of capacitor 2; i.e., value 34 in FIG. 4, this being an amplitude less than "A." Diode $V_4$ may be of the silicon semiconductor type, or of the high vacuum type, similar to $V_2$. For sake of simplicity in practical embodiments, we employ the same type designation for both diodes $V_2$ and $V_4$, although the electrical requirements upon $V_4$ are less demanding than upon $V_2$.

As the charge leaves capacitor 7, returning through inductor 10 and diode $V_4$, voltage $E_2$ decreases, as shown at 35 in FIG. 4. This continues until the previous value 34 is again reached. Since thyratron $V_3$ has been previously rendered non-conducting and since current cannot flow when anode 11 of diode $V_4$ has a lower potential than cathode 12 thereof, all current flow in the circuit $V_3$, 7, 10 and $V_4$ ceases and is not initiated until time $t_2$ occurs in the next cycle of operation.

As a result of the firing of thyraton $V_3$, voltage $E_1$ at the input of line 4 does not vary from the fixed level occurring at the time of the firing; a level indicated as 36 in FIG. 2. In a typical embodiment this fixed level may persist for the order of 1,000 microseconds. The rising voltage part 30 of the waveform may similarly occupy a time of 700 microseconds. The duration of the modulating pulse is typically 3 microseconds. The total period of these time increments is 2,703 microseconds, which corresponds to a repetition rate of 360 per second. This rate may be varied over considerable limits, particularly to lower values in present-day embodiments.

Shorting switch 6, line 4 and certain load elements to be described may be according to the patent to the present co-inventor Charles Theodore, "High Power Pulse Type Modulator Employing Vacuum Tube to Divert Current for Ignition Deionization," Serial No. 84,126, filed January 23, 1961, now U.S. Patent No. 3,078,418.

Briefly setting forth the structure here, shorting switch 6 may be a hydrogen thyratron, a mercury pool ignitron, a trigger gap or another equivalent, which is capable of carrying the relatively very heavy short-circuit current at high initial voltage upon being triggered at an appropriate instant by a timed pulse impressed upon a control electrode, as schematically represented by electrode terminal 14 in FIG. 1.

Line 4 may typically be composed of a number of series-connected inductors 15, each having an inductance of the order of less than one microhenry, and of a number of shunt-connected capacitors 16, each having a capacitance of the order of five one-hundredths of a microfarad. The total capacitance of the line may be of the order of one-fourth microfarad. More sections of the line are employed than have been shown, of course, and the first inductor has only half the inductance of the others.

A pulse transformer 17 is connected with line 4 in series with primary 18 of the transformer in circuit to the common ground connection. Secondary 19 of the transformer is connected to the anode and cathode of a typical load; i.e., klystron $V_5$. Firing of switch (tube) 6 creates a short across line and primary. This discharges the line through the primary and so produces a high voltage pulse across the secondary for actuating the klystron. The amplitude of this pulse may be 300 kilovolts.

Voltage divider 20, 21 is provided to sense voltage $E_1$ and to give a reduced amplitude replica thereof for control purposes. These two series-connected resistors are connected from the high potential side of the whole circuit to ground, which is equivalent to stating that the voltage divider is connected in shunt to switch device 6. Typically, a voltage division ratio of 1,000 to 1 is employed. This provides a voltage of 36 volts at the junction of the two resistors, tap 22, when the regulated value of $E_1$ (amplitude 36 in FIG. 2) is 36 kilovolts. The reduced voltage at tap 22 is impressed at one input terminal of differential amplifier device 23.

The other input to differential amplifier 23 is a constant potential from battery 24. In practice this battery is a regulated power supply and it is provided with a control to adjust the voltage output. This is indicated by the arrow through the battery in FIG. 1. Adjustment of this voltage adjusts the high voltage impressed upon line 4, voltage $E_1$.

Differential amplifier 23 may have several known forms. The purpose is to supply a relatively fixed zero or negative output at output 25 for all values of $E_1$ less than the particular value chosen for the regulated value (amplitude 36 in FIG. 2) and a relatively large and fixed positive value immediately after that value of $E_1$ is reached. This is for the purpose of firing thyratron $V_3$ to initiate the regulating cycle thereof.

One form of differentially operating amplifier is the "squaring amplifier," the characteristic of which is to give zero or negative output until the positive input from conductor 22 exceeds that set by battery 24 and then to give a maximum positive output thereafter.

Another circuit is the "Series-Triggered Blocking Oscillator," Preferred Circuit No. PC 49 from the "Handbook of Preferred Circuits for Navy Aeronautical Electronic Equipment," September 1, 1955, pp. 49–2 to 49–4, published by the Superintendent of Documents, U.S. Government Printing Office. In this device the desired output pulse is obtained when an increasing trigger voltage exceeds a given positive level. Battery 24 is then poled to provide a negative bias for the blocking oscillator and acts as a reference voltage.

It will be understood that the voltage level 36 of FIG. 2 is capable of being adjusted over a considerable range by variation of the time of triggering the grid of thyratron $V_3$ via conductors 25. This time during an operating cycle is set by the value to which battery 24 voltage is adjusted, or by the equivalent adjustment that may be made in other circuits performing the differential amplifier function.

When the capacitance of capacitor 7 is made essentially equal to the toal capacitance of line 4, say ¼ microfarad, the range over which the adjustment of pulse amplitude for the modulator can be varied is in excess of two to one. In other words, $E_1$ of FIG. 2 being adjustable at the will of the operator from a value slightly below voltage level "B" to less than voltage level "A." In this choice of parameters, however, the variation of the capacitor 7 voltage $E_2$ is more than has been shown in FIG. 4. This causes a relatively large current flow in and out of capacitor 7, with the accompanying loss of electrical energy due to inherent capacitor losses. While this is small in comparison to the losses of the prior art,, we have found that if capacitor 7 is increased in capacitance to, say, four times the total capacitance of line 4, the capacitor current losses are very small. This latter choice of parameters reduces the extremes to which the pulse voltage can be adjusted, but this still remains a ratio approaching two to one. For instance, a maximum value of 40 k.v. can be adjusted downward to 24 k.v.

A limit exists upon the maximum value of capacitance allowable for capacitor 7. The time constant of inductor 3 and capacitor 7 must be less than the interpulse period, otherwise the charge and discharge functioning of this part of the circuit will not be executed quickly enough to allow deionization of thyratron $V_3$. This tube must have a zero or a negative anode voltage for a period of time after conduction to recover its holdoff capability.

In FIGS. 2–4, the termination of the first cycle of operation is at $t_4$, at which time shorting switch 6 operates and the brief but high-energy modulating pulse is formed and passed on to load $V_5$.

In the subject circuit, considerable electric power is returned to capacitor 2 of power supply 1. The amount returned depends upon how much the operating voltage of the system has been reduced by the regulation selected. When the pulse amplitude is 90% of the maximum possible value the power returned is 4 kilowatts for the 20 k.v. power supply previously chosen for a typical embodiment. When the pulse amplitude is only 50% of the maximum possible value the power returned is 20 kilowatts.

It is seen that a considerable waste of power is occasioned when all of the unused power is dissipated, as in the second manifestation of the prior art reported above. Even when only the resistive-capacitative loss elements are employed, as in the first manifestation of the prior art, the losses are undesirably large. The heat generated in the apparatus is considerable, also, particularly where several such modulators may be employed.

As an incidental factor, when the pulse voltage height is reduced to a value, say, of half the maximum value available for reason of desired control on the part of the operator, the rising characteristic 30 of FIG. 2 is terminated more quickly than otherwise. That is, time indicia $t_2$, marking the firing of thyratron $V_3$, is moved forward in time. This results in a shorter charge period and thus a faster pulse repetition rate. This situation can be compensated for by increasing the dwell period from from time=0 to time=$t_1$, by altering the time at which thyratron $V_1$ is fired.

Thyratron $V_1$ is fired by impressing a pulse upon grid connection 5 from known delay means that are triggered when switch 6 fires and shorts. Suitable means consist of the phantastron delay circuit, Preferred Circuit PC 55 or PC 56, of the above-mentioned reference; or a resistor-capacitor charge circuit. Typical delays required are of the order of 1,000 microseconds. In FIG. 1 the input timing for this circuit may be taken from terminal 14, at which terminal the switch is triggered. The delayed pulse is impressed at terminal 5 of $V_1$.

An advantage in operating stability accrues from the use of tubes $V_1$ and $V_2$ in that all power supply voltage is withheld from switch (tube) 6 for a relatively very long period during each operating cycle. It is known that gaseous discharge tubes employed for element 6 will continue to conduct after firing unless an interval of absence of voltage at the anode is provided. For mercury pool ignitrons, for example, this is a minimum of 150 microseconds. By employing $V_1$ and $V_2$ this no-voltage period is of the order of 1,000 microseconds and so the reliability of operation is very great.

Also, $V_1$, being deionized, prevents the passage of a small residual current to line 4 that would otherwise flow when capacitor 7 was charged to essentially the full voltage of the power supply and beyond. Note curve 33 in FIG. 4.

For high power embodiments it is similarly not possible to obtain a thyratron for $V_1$ that will relatively immediately withstand the applied voltage of the power supply after the desired conduction cycle has been completed. For this reason, diode $V_2$ is employed. It will not allow current flow until an appreciable positive voltage appears at its anode, which element is connected to thyratron $V_1$. For low power embodiments, hydrogen thyratrons are available that will withstand the applied voltage and then diode $V_2$ is replaced by a connecting wire.

It is also possible to replace diode $V_4$ by a connecting wire if the operating frequency of the pulse modulator is always somewhat greater than the resonant frequency of inductor 3 and capacitor 7. This allows an important saving in cost in high power applications. This statement is made because we have observed that for a practical embodiment having a frequency range of between 200 and 360 pulses per second the current through a diode $V_4$, if present, never reduces to zero.

It will be understood that various embodiments are possible according to our invention, but for the more critical practice of high voltage high power embodiments illustrative tube types are here given. For thyratrons $V_1$ and $V_3$ an RCA 5563A or an Amperex 6879 are suitable. Similarly, and although the current carrying requirement upon $V_4$ is not as great as upon $V_2$, for reasons of interchangeability, we prefer the Eimac 2X3000 vacuum diode. For an equivalent silicon diode, we connect one hundred 1N1190 Westinghouse diodes in series, to constitute $V_{2a}$ as shown in FIG. 5.

High voltage isolation is required between the input and the output terminals of the differential amplifier 23, but this is known art and so has not been illustrated.

It will be further understood that pulse transformer 17 need not necessarily be employed and that another useful load rather than the illustrative klystron $V_5$ may be substituted for the primary 18 of transformer 17 or directly substituted for the klystron.

Filament heating power is required for the several vacuum tubes and thyratrons and for high power embodiments water cooling is also required. Since these aspects are known they have not been illustrated.

Although specific examples of voltages, currents, waveforms and values for the several circuit elements have been given in this specification to illustrate the invention, it is to be understood that these are by way of example only and that reasonable departures can be taken therefrom without departing from the inventive concept. Other modifications of the circuit elements, the characteristics thereof, details of circuit connections and alteration of the coactive relation between elements may also be taken under our invention.

Having thus fully described our invention and the manner in which it is to be practiced, we claim:

1. In an electrical modulator having pulse-forming means, power supply means connected to said pulse-forming means, and means for actuating said pulse-forming means; means to control the amplitude of pulses formed by said pulse-forming means comprising
   current discharge means constituted to conduct electricity,
   and charge-accumulating means,
   said discharge means and said accumulating means connected in series across said power supply means,
   means to cause said discharge means to conduct electricity prior to the time when said power supply means fully charges said pulse-forming means,
   and further means connected to said charge-accumulating means and to said power supply means for returning excess power stored in said charge-accumulating means to said power supply means.

2. In the electrical modulator means to control the amplitude of pulses of claim 1,
   means to cause the discharge means to conduct comprising a differential amplifier having a voltage reference connected to said means to cause the discharge means to conduct.

3. In an electrical modulator having pulse-forming means, inductive power supply means connected to said pulse-forming means, and switch means for actuating said pulse-forming means; means to control the amplitude of each pulse formed by said pulse-forming means comprising ionizable means,
    and charge-accumulating means,
    said ionizable means and said charge-accumulating means connected in series across said inductive power supply means,
    means to cause said ionizable means to conduct prior to the time when said inductive power supply means has fully charge said pulse-forming means,
    and further inductive means connected to said charge-accumulating means and to said inductive power supply means for returning excess power stored in said charge-accumulating means to said inductive power supply means.

4. In the electrical modulator means to control the amplitude of pulses of claim 3,
    means to cause the ionizable means to conduct comprising a blocking oscillator having a voltage reference connected to said means to cause the ionizable means to conduct.

5. The electrical modulator according to claim 3 wherein a thyratron is inserted between said ionizing means and said pulse-forming means to prevent electrical energy from reaching said pulse-forming means near the end of each operating cycle
    when the charge upon said charge-accumulating means has accumulated to thus raise the potential thereacross to a value approaching that across said inductive power supply means.

6. In an electrical modulator having pulse-forming means, inductive power supply means connected to said pulse-forming means, and switch means for actuating said pulse-forming means; means to control the amplitude of each pulse formed by said pulse-forming means comprising
    a thyratron,
    and a capacitor,
    said thyratron and said capacitor connected in series across said inductive power supply means,
    a differential amplifier having a voltage reference,
    means to apply a voltage related to the voltage to which said pulse-forming means is charged to said differential amplifier to obtain an output therefrom when said related voltage exceeds said voltage reference,
    the output of said differential amplifier connected to said thyratron to cause the same to conduct,
    and an inductor connected to said capacitor and to said inductive power supply means through a diode for returning excess charge stored in said charge-accumulating means to said inductive power supply means after a said output from said differential amplifier.

7. In an electrical modulator having pulse-forming means, inductive power supply means to power said pulse-forming means, and discharge means for shorting said pulse-forming means, an ionizable means connected in series between said power supply means and said pulse-forming means,
    means to ionize said ionizable means only after an interval of time subsequent to actuation of said discharge means to prevent electrical energy from reaching said pulse-forming means during said interval of time thereby preventing premature self-actuation of said discharge means.

8. In the electrical modulator of claim 7 said ionizable means comprised of a thyratron.

9. In the electrical modulator of claim 7 said ionizable means comprised of a controlled gaseous discharge means and a diode connected in series.

10. In the electrical modulator of claim 7 said ionizable means comprised of a thyratron and a large number silicon diodes all connected in series.

References Cited in the file of this patent

UNITED STATES PATENTS 2,832,928    Arnold et al.     Apr. 29, 1958